United States Patent
Lavallee et al.

[11] 3,756,073
[45] Sept. 4, 1973

[54] NON-CONTACT TONOMETER

[75] Inventors: Robert G. Lavallee, Ashland; Bernard Grolman, Worcester, both of Mass.

[73] Assignee: American Optical Corporation, Southbridge, Mass.

[22] Filed: Nov. 26, 1971

[21] Appl. No.: 202,423

[52] U.S. Cl. .................................... 73/80, 356/152
[51] Int. Cl. ............................................. A61b 3/16
[58] Field of Search ................. 73/80; 356/152, 153

[56] References Cited
UNITED STATES PATENTS 3,538,754  11/1970  Grolman et al. ....................... 73/80
3,585,849  6/1971  Grolman ................................. 73/80
3,471,237  10/1969  Hall .................................. 356/153 X
3,552,857  1/1971  Hock et al. ....................... 356/152 X
2,352,179  6/1944  Bolsey ................................ 356/153
3,603,688  9/1971  Vaniz ................................ 356/152 X

*Primary Examiner*—Herbert Goldstein
*Attorney*—William C. Nealon et al.

[57] ABSTRACT

An alignment system for a non-contact tonometer in which the pneumatic and corneal monitoring systems are aligned relative to the cornea such that a target image reflected from the cornea is superimposed on an aiming reticle and on a photocell. When thus aligned, and only then, the apparatus is electrically armed permitting it to discharge its fluid pulse.

4 Claims, 4 Drawing Figures

Patented Sept. 4, 1973

NON-CONTACT TONOMETER

BACKGROUND OF THE INVENTION

This invention relates to tonometry and is an improved feature of the Method And Apparatus For Measuring Intraocular Pressure, disclosed and claimed in U.S. Pat. No. 3,585,949, issued on June 22, 1971 to Bernard Grolman. The improvement of this invention relates to an alignment verification system for the non-contact tonometer described in the aforementioned patent.

The non-contact tonometer to which this invention relates operates by discharging an air pulse of a known force-time relationship onto the cornea of a patient. The resulting deformation of the cornea from convexity through applanation to concavity, and return, is observed as a function of time and thus correlated to intraocular pressure. In order that the known input force have a meaningful effect on the cornea, the positioning and alignment of the apparatus relative to the subject cornea is critical.

SUMMARY OF THE INVENTION

It is therefore an object of the present invention to provide a non-contact tonometer with an accurate and reliable provision for alignment and positioning of the instrument in axial, vertical, and lateral dimensions.

Another object is to provide such a tonometer and alignment provision with a verification feature which permits operation of the tonometer only when proper alignment is achieved.

Further objects, advantages, and features of this invention will become apparent from the following description of one embodiment thereof, given in connection with the accompanying drawing.

Briefly, the present invention is practiced in one form by a non-contact tonometer having an optical spherometer type of alignment system for positioning the apparatus at a known distance from and normal to a corneal surface. A target image reflected from the spherical corneal surface is viewed by an observer and the apparatus aligned such that the image coincides with an aiming reticle. The image, when thus aligned, is also detected by a photocell whereupon the operating trigger circuit for the tonometer is armed. Thus, the instrument will only operate when proper alignment is achieved.

DRAWING

DESCRIPTION

Figure 1:
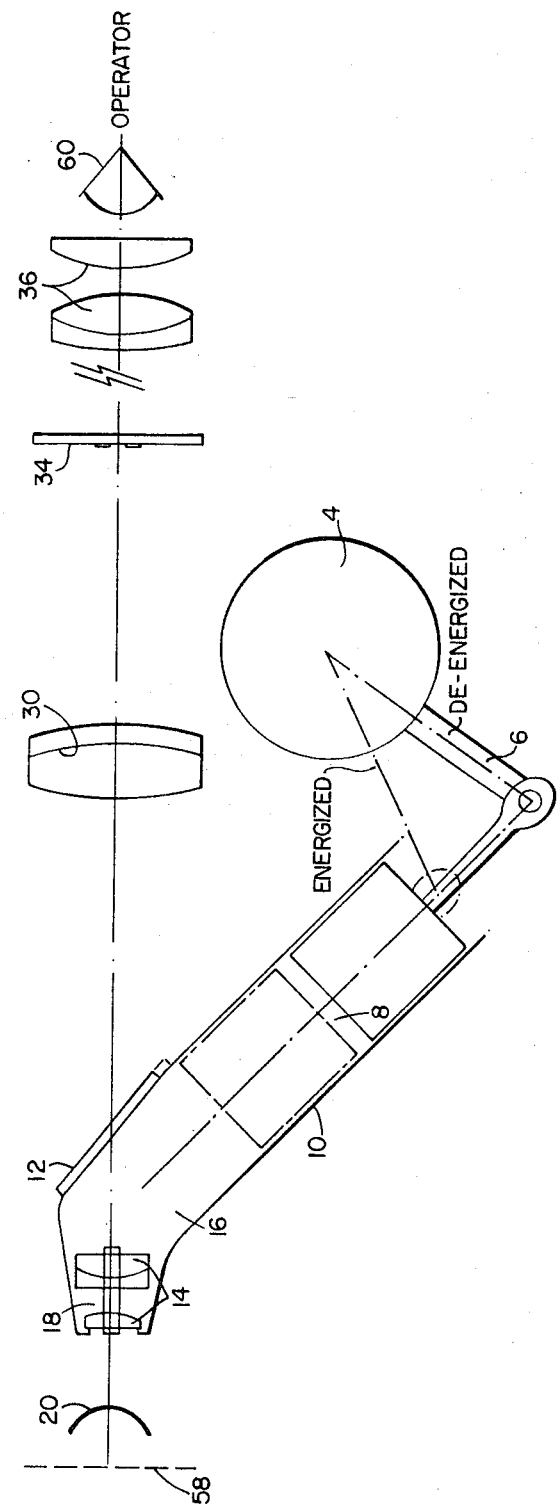
FIG. 1 is a schematic side view of the pneumatic system of a non-contact tonometer to which this invention relates.

Referring now to FIG. 1, a non-contact tonometer is generally indicated at 2 and its pneumatic system is depicted here in side view. It essentially includes a rotary solenoid 4, a connecting linkage 6, a piston 8, and a cylinder 10. Piston 8 is disposed with the cylinder 10 and is connected to the actuating solenoid 4 by connecting link 6. Cylinder 10, together with a window 12 and a modified microscope objective 14 define a pressure chamber 16. The objective 14 defines an axial passage through which an orifice tube 18 extends. This apparatus is shown disposed adjacent to the cornea 20 of a patient. Orifice tube 18 is directed toward the cornea along axis 26. A telescope lens 30, reticle plane 34, and eyepiece 36 are also located along axis 26.

When the solenoid 4 is momentarily energized, the piston 8 accelerates at a controlled rate into the pressure chamber 16 in cylinder 10. The positive pressure thus generated within chamber 16 is ported through the orifice tube 18 in the direction of the patient's cornea 20. When this air pulse impinges on a properly oriented cornea 20, it sequentially causes the deformation of the corneal surface through a reduction of curvature, then through an occurrence of applanation, to a slight concavity. Then, with the decay of the force-time envelope, there is progressive restoration of the cornea back through applanation.

Figure 2:
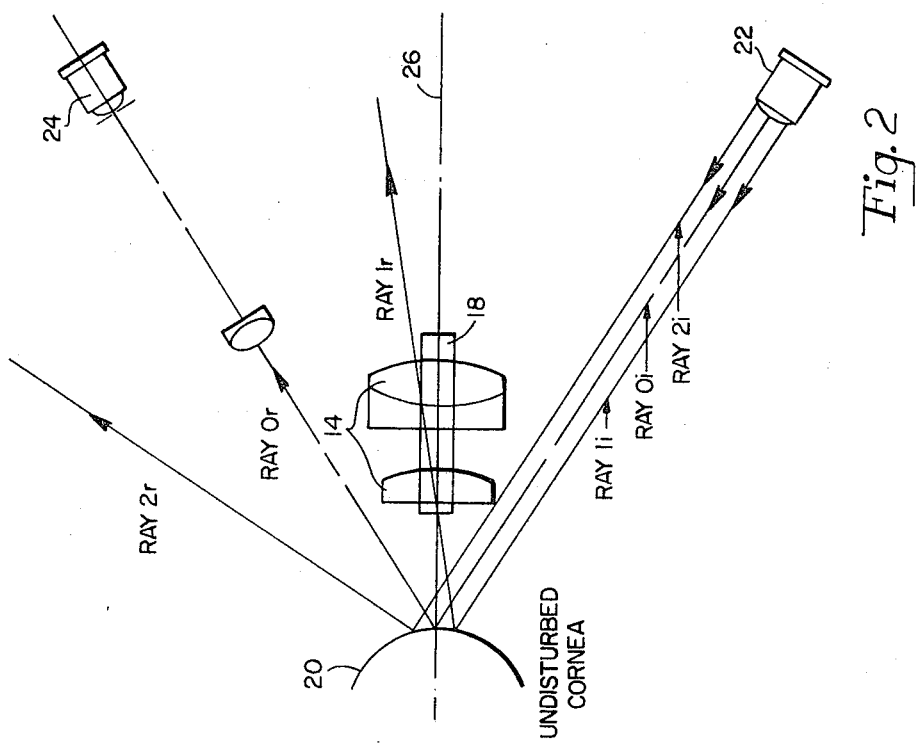
FIG. 2 is a schematic plan view of the monitoring system of this tonometer and an undisturbed cornea.

Referring now to FIG. 2, the objective 14, tube 18, and cornea 20 are shown from a top view as they are situated along axis 26 and as they relate to elements of a monitoring system which includes a transmitter 22 and a telecentric receiver 24. Transmitter 22 directs a collimated beam of light, represented by three incident rays $1i$, $0i$, and $2i$ at cornea 20. Reflected rays $1r$, $0r$, and $2r$ are shown reflecting in various directions from the convex (or non-planar) corneal surface.

Figure 3:
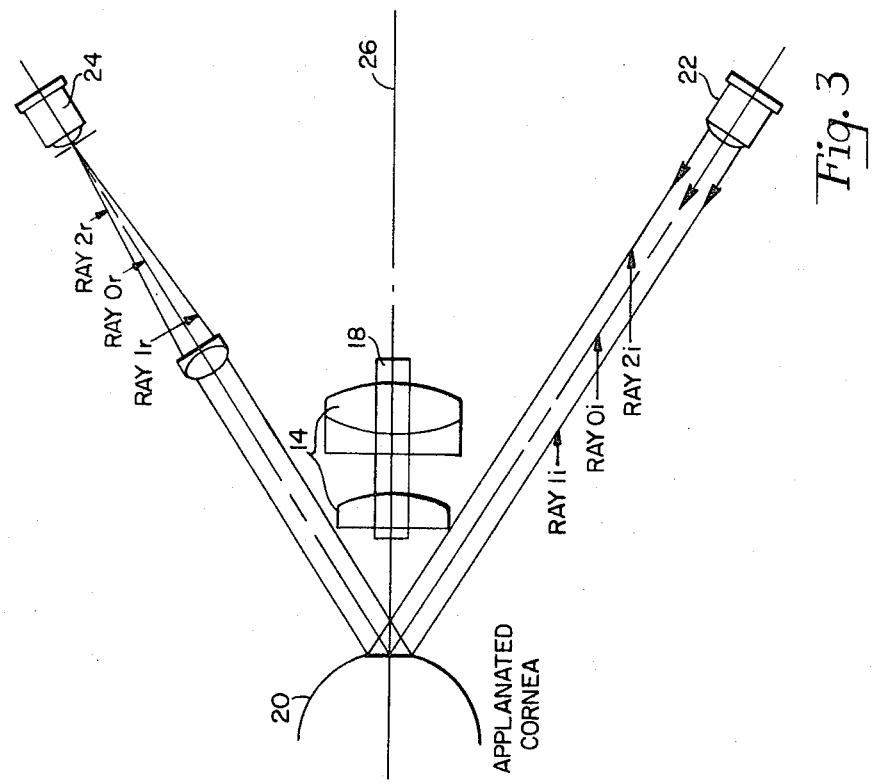
FIG. 3 is a view similar to Figure 2 showing the monitoring system and an applanated cornea.

FIG. 3 is a view of the same elements shown in FIG. 2 except that the cornea 20 in this case is shown at an instantaneous occurrence of applanation as the result of the air pulse discharge through orifice tube 18. The effect of applanation on the monitoring system is shown whereby the collimated incident light rays $1i$, $0i$, and $2i$ are reflected by the applanated surface as collimated rays and thus the telecentric receiver 24 receives a maximum signal at this instantaneous occurrence. This maximum signal thus indicates the occurrence of applanation.

Figure 4:
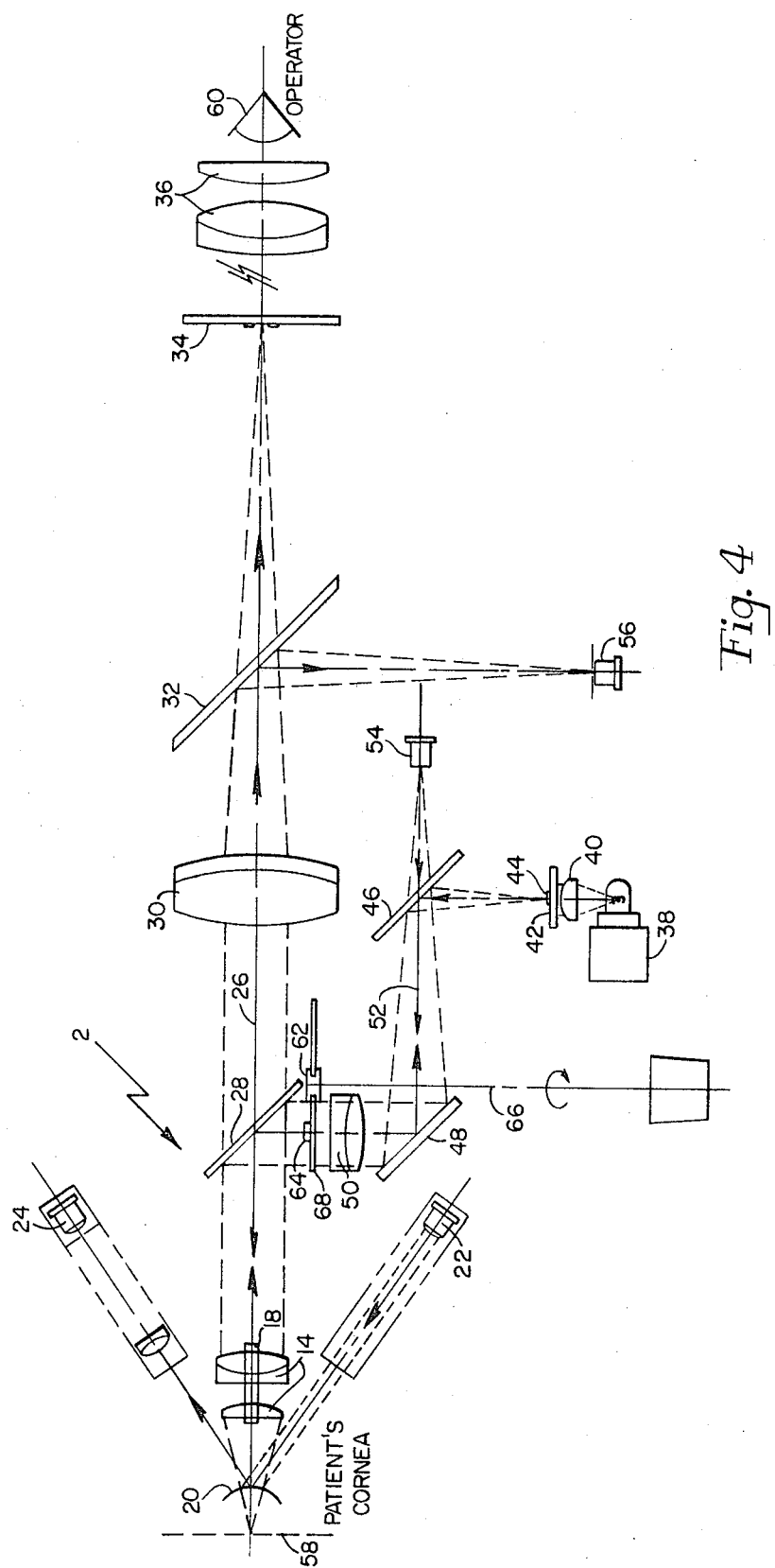
FIG. 4 is a schematic plan view of the tonometer alignment verification system of this invention.

Referring now to FIG. 4, the alignment verification system of this invention is shown in a somewhat schematic plan view. Again, the tonometer 2 with objective 14 and orifice tube 18 is shown positioned adjacent the patient's cornea 20 along an alignment axis 26 normal to the corneal surface. Light transmitter 22 and receiver 24 are shown obliquely situated at equal angles on opposite sides of the alignment axis 26.

A projection beam splitter or beam deflector 28, telescope lens 30, detection beam splitter 32, aiming circle reticle 34, and eyepiece 36 are disposed in optical alignment with objective 14 along the alignment axis 26. A target projection system includes a light source 38, collecting lens 40, light transmitting surface 42 on which is placed a fixation target 44, a beam splitter 46, mirror 48, and collimator lens 50, all disposed along a projection axis 52 which joins alignment axis 26 at the projection beam splitter 28. A light emitting diode 54 is positioned behind beam splitter 46 such that light from the diode 54 (preferably of approximately 900 nm wavelength), which is in the infra-red or invisible range of the light spectrum, is transmitted through the beam splitter 46 and along the projection axis 52. Detection beam splitter 32 partially reflects light from the alignment axis 26 to an alignment detector or photodetector 56. The fixation target 44 is preferably a red spot on a diffuse white background 42.

In operation, the projection system projects an image of target 44, through objective 14, to the image plane 58 of objective 14. When the tonometer 2 is moved so that the image plane 58 is coincident with the center of curvature of the cornea 20, a corneal virtual or mirror image of the target is re-imaged by objective 14 and telescope 30 in the plane of circle reticle 34. This image at the plane of reticle 34 is then viewed through eyepiece 36 by the operator, represented at 60. When the alignment axis 26 is normal to the local corneal surface, the image of target 44 is centered within the aiming circle reticle 34.

The corneal surface 20 under observation is limited to a desired small portion of the entire corneal surface. It is insured that the alignment is with respect to the desired portion by directing the subject eye to fixate target 44, which is viewed by the patient along alignment axis 26 (and projection axis 52). The patient views the target 44 at optical infinity through the orifice tube 18. When the eye under observation is sightless, an external fixation light (not shown) is used toward which to direct the sighted eye and thus to direct the sightless eye in a frontal orientation with respect to the instrument.

When the instrument is properly aligned, the image of target 44 is projected toward the cornea 20 and reflected therefrom and re-imaged at the center of circle reticle 34 (where it is observed by the operator). Concurrently 900 nm emission from diode 54 is also projected along axis 52 toward cornea 20 and similarly reflected along axis 26. That is, from the exit side of beam splitter 46, radiations from the target 44 and from diode 54 are coincident along the projection axis 52 and the alignment axis 26. Detection beam splitter 32 directs some of the reflected radiation from both the target 44 and the diode 54 to alignment detector or photodetector 56. Detector 56 is sensitive to the 900 nm radiation from diode 54 and when subjected to such radiation, detector 56 arms the trigger circuit which controls the solenoid 4 and the air pulse discharge of the tonometer. The pupil of the detector 56 is sized so that it functions automatically (in the same sense that the aiming circle reticle is used visually) to permit the tonometer to function only when the alignment satisfies spatial tolerances determined by the diameters of circle reticle 34 and the pupil of the sensing aperture of detector 56.

To provide for the correction of large refractive errors in the subject eye under test, an additional feature of the alignment system includes a five-position turret 62 interposed between collimating lens 50 and beam splitter 28. Turret 62 has five apertures selectively positionable in the projection axis 52 for the transmission of the full beam of projection light as represented in the drawing. In the centers of four of these apertures, a small (e.g. 3 millimeter diameter) dioptric lens 64 is situated, each of a different power. The dioptric lens 64 is small relative to the projection light beam and therefore modifies only its central aperture corresponding to the orifice in tube 18 through which the patient fixates the target. Selective positioning of turret 62 about an axis of rotation 66 provides the target 44. The plane parallel window 68 upon which the correcting lens 64 is mounted, does not alter the aperture of objective 14 which focuses the target 44 at image plane 58.

It will be apparent that the alignment fixation apparatus described herein will add reliability to the tonometer and its measurements. Furthermore, it will be apparent that the photo-detector verification feature of this invention which operates as a "permit" switch will add substantially to the utility of the entire apparatus. It will avoid faulty measurements and the necessity for repeated tests.

The foregoing description of one embodiment of this invention is given by way of illustration and not of limitation. The concept and scope of the invention are limited only by the following claims and equivalents thereof which may occur to others skilled in the art.

What is claimed is:

1. A non-contact tonometer having a pneumatic system in which a fluid pulse is directed along a pneumatic axis and at a patient's corneal surface, and a monitoring system in which the effect of said pulse on said surface is determined, said pneumatic system and said monitoring system each including a control means, said tonometer being characterized by an alignment system disposed relative to an alignment axis coincident with said pneumatic axis, said alignment system including:

an objective lens and an observation means disposed along said alignment axis, projection means to project a visible target image through said objective lens along said alignment axis toward the focal plane thereof and toward said corneal surface, said target image being reflected by said corneal surface along said alignment axis to form a visible reflected image at said observation means, a source of invisible alignment radiation and means to project an image of the source along said alignment axis toward said corneal surface, said source image being reflected by said corneal surface along said alignment axis toward said observation means, a beam divider disposed along said alignment axis between said objective and said observation means to direct the source image to a conjugate image plane, and a detector sensitive to said invisible alignment radiation at said conjugate image plane, said detector operatively connected to the control means of said pneumatic system and responsive to a conjugate reflected source image coincident thereon to actuate the control means of said pneumatic system.

2. A non-contact tonometer as defined in claim 1, said projection means including a visible light source, a target, and a beam deflector disposed along a projection axis, said projection axis joining said alignment axis at said beam deflector, said visible light source and said target effective to project said target image along said projection axis.

3. A non-contact tonometer as defined in claim 2, said projection means further including a battery of dioptric lenses selectively positionable along said projection axis to accommodate for refractive error in the eye of a patient enabling the patient to better fixate said target image.

4. A non-contact tonometer as defined in claim 2, said invisible alignment radiation being about 900nm and said detector is insensitive to visible light and sensitive to light having a wavelength of about 900nm to provide non-interfering visual and invisible alignment systems.

* * * * *